United States Patent
Matula et al.

(10) Patent No.: US 10,409,753 B2
(45) Date of Patent: Sep. 10, 2019

(54) ADAPTERS, SYSTEMS AND METHODS FOR ADAPTING PCIE EXPANSION CARDS TO PCIE COMPONENT BAYS

(71) Applicant: DELL PRODUCTS L.P., Round Rock, TX (US)

(72) Inventors: Terry L. Matula, Austin, TX (US); Andrew O. Ingalls, Round Rock, TX (US); Randall E. Juenger, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 29 days.

(21) Appl. No.: 15/702,299

(22) Filed: Sep. 12, 2017

(65) Prior Publication Data

US 2019/0079890 A1 Mar. 14, 2019

(51) Int. Cl.
*G06F 13/20* (2006.01)
*G06F 13/40* (2006.01)
*G06F 13/42* (2006.01)

(52) U.S. Cl.
CPC ...... *G06F 13/4045* (2013.01); *G06F 13/4282* (2013.01); *G06F 2213/0026* (2013.01)

(58) Field of Classification Search
None
See application file for complete search history.

(56) References Cited

U.S. PATENT DOCUMENTS 8,880,817 B2 11/2014 Krishnan et al.
9,728,876 B1 8/2017 Shiue et al.
2015/0382499 A1* 12/2015 Chiasson ............. G11B 33/124
361/679.33
2017/0164501 A1* 6/2017 Killen ................. H05K 7/1489
2017/0168943 A1* 6/2017 Chou ................. G06F 12/0833
2017/0220505 A1 8/2017 Breakstone et al.

OTHER PUBLICATIONS

Wikipedia, "U.2", Printed From Internet Aug. 14, 2017, 2 pgs.
Beaudet, "PCIe and Storage Devices Get Connected", EDN Moment, Jan. 17, 2014, 6 pgs.
Williams, "PCI Express Developing New Features Even as It Heads for a new Generation", RTC, Dec. 2014, 4 pgs.
Wikipedia, "PCI Express", Printed From Internet, Aug. 13, 2017, 24 pgs.
Lambert, "Making Sense of Next-Gen SSDs", MSI, Dec. 1, 2015, 5 pgs.
Wikipedia, "Expansion Card", Printed From Internet Aug. 13, 2017, 6 pgs.

* cited by examiner

*Primary Examiner* — Hyun Nam
(74) *Attorney, Agent, or Firm* — Egan Peterman Enders Huston

(57) ABSTRACT

Adapters, systems and methods are provided that may be implemented to adapt a Peripheral Component Interconnect Express (PCIe) expansion (or add-in) card for mounting into a PCIe component bay (e.g., front-accessible "flex bay") of an information handling system chassis, such as desktop, server or tower computer chassis. An adapter may be provided that carries an edge mount PCIe expansion card that may be mechanically inserted (e.g., in place of a solid state drive "SSD" carrier or other PCIe peripheral component carrier) into the bay to electrically interface the PCIe expansion card with PCIe lane/s and other signal pins of a blind mate PCIe interface bay connector that extends outwardly into a component bay from the distal side (or rear) of the bay.

25 Claims, 12 Drawing Sheets

ADAPTERS, SYSTEMS AND METHODS FOR ADAPTING PCIE EXPANSION CARDS TO PCIE COMPONENT BAYS

FIELD

This invention relates generally to information handling systems and, more particularly, to expansion cards for information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Peripheral Component Interconnect Express Generation 3 (PCIe 3.0) is an existing high speed serial bus standard that communicates across lanes that use differential signaling to support one or more full duplex byte streams to transport data packets. Standard-size PCIe 3.0 expansion connectors are provided on a computer motherboard inside a computer system chassis (e.g., desktop or tower computer, server) and have slots for edge insertion of printed circuit board (PCB) expansion (or add-in) cards to add functionality to the computer system via a PCI expansion bus on the motherboard. A standard PCIe 3.0 expansion card has an edge connector having pins that correspond to the pins within the expansion connector slot on the motherboard. Each lane connects to a host processor of the information handling system through the PCIe 3.0 expansion bus. The number of lanes supported by a given standard PCIe 3.0 expansion connector and expansion card connector may be one (x1), four (x4), eight (x8), twelve (x12), sixteen (x16) with connector length increasing with the number of lanes. Standard PCIe 3.0 expansion cards are available in various physical sizes (having various card lengths and card widths), and a PCIe 3.0 expansion card can fit into an expansion connector slot that is the same length or longer, but typically cannot fit into an expansion connector slot that is shorter (there are open-ended connectors that allow longer cards to fit in shorter slots).

SFF-8639 (also known as U.2) is a computer interface standard developed by the SSD form factor working group (SFFWG) for connecting 2.5" and 3.5" non-volatile memory solid state drives (SSDs) to computer systems. A U.2 connector has multiple pins for connecting four PCIe lanes and other signals to a mating connector of a SSD.

As shown in FIG. 1, a tower computer system 100 has been provided with multiple front access flex-bays 130 that each accept a 3.5" SSD carrier 120 that is accessible to a user, so as to allow multiple SSD carriers 120A-120D to be installed and/or different SSD carriers 120 to be swapped into and out of the computer system 100 by the user. Each of the multiple flex bays 130 has a blind mate system-side U.2 connector for connection to the pins of a mating drive-side U.2 connector. The multiple system-side U.2 connectors are each mechanically coupled to a backplane board and electrically coupled to PCIe lanes and other signal traces on the backplane board that connect to corresponding components on the computer system motherboard and/or to components elsewhere in the system. Each system-side U.2 connector extends outward into the flex bay 130 to present a connector slot for receiving connector pins of a SSD that is inserted into the flex bay 130.

SUMMARY

Disclosed herein are adapters, systems and methods that may be implemented to adapt a Peripheral Component Interconnect Express (PCIe) expansion (or add-in) card for mounting into a PCIe component bay (e.g., front-accessible "flex bay") of an information handling system chassis, such as desktop or tower computer chassis. Such a PCIe component bay may be characterized as a modular bay that can be configured to receive modular computer peripheral options that require a PCIe interface with appropriate side bands and voltage rails. The disclosed adapters, systems and methods may be advantageously implemented to provide an adapter that carries an edge mount PCIe expansion card that may be mechanically inserted (e.g., in place of a non-volatile memory solid state drive "SSD" carrier or other PCIe peripheral component carrier) into the bay to electrically interface the PCIe expansion card with PCIe lane/s and other signal pins of a blind mate PCIe interface bay connector (e.g., SSD-compatible connector or other type of blind mate PCIe connector) that extends outwardly into a PCIe component bay from the distal side (or rear) of the bay, such as from a storage backplane of the system.

In one embodiment, an adapter may include an interface printed circuit board (PCB) card that includes a system-side connector corresponding to the PCIe interface bay connector and an industry standard PCIe card edge (e.g., straddle) slot connector on the PCIe expansion card-side. The PCIe lane/s of the system-side connector may be routed by circuitry in the form of conductive signal wires or traces on the PCB interface card to appropriate pins of the PCIe slot connector, together with other signal traces (e.g., SMBUS, etc.) required or otherwise used by the PCIe expansion card. In one embodiment, an adapter may be provided with additional circuitry to support particular PCIe expansion cards, such as a voltage regulator (VR) that may be provided with appropriate traces on the interface card to regulate PCIe interface bay connector power supply voltage supplied from the system side to the appropriate voltage for use by the PCIe expansion card.

In one exemplary embodiment, the disclosed adapters, systems and methods may be implemented to allow a user to install a standard PCIe expansion card with its mechanical mounting adapter into the PCIe component bay without opening and/or removing a cover to the chassis so as to enable the capabilities of the expansion card and thus add functionality to the information handling (e.g., computer)

system. In a further embodiment, the mechanical mounting adapter may be configured to hold the expansion card in position to expose any bracket input/output (I/O) connectors of the expansion card to the proximal side (or front) of the PCIe component bay. In this way, many existing types of standard PCIe expansion cards of various physical sizes (lengths and widths) may be supported in PCIe component bays without using any of the normal internal PCIe connector slots within an information handling system (or in systems having no internal PCIe connector slots). Example types of such PCIe expansion cards include, but are not limited to, IEEE 1394 cards, serial port cards, USB 3.1 cards, NBASE-T network cards, sound cards, etc. A PCIe expansion card may optionally include one or more processing devices to provide the designated functionality or functionalities of the expansion card.

In one respect, disclosed herein is an adapter, including: a carrier dimensionally configured to be received within a PCIe component bay of an information handling system chassis enclosure, the carrier having a distal end a proximal end with an adapter cavity defined therebetween; a first PCIe adapter connector mechanically coupled to the carrier to face outward at the distal end of the carrier in position to mechanically and electrically mate with a system PCIe connector of the information handling system that is disposed within the PCIe component bay; a second PCIe adapter connector mechanically coupled to the carrier to face into the adapter cavity to mechanically and electrically mate with a PCIe connector of a PCIe expansion card received within the adapter cavity; and circuitry electrically coupled between the first PCIe adapter connector and the second PCIe adapter connector, the circuitry including conductors corresponding to signals of one or more PCIe signal lanes between the first PCIe adapter connector and the second PCIe adapter connector.

In another respect, disclosed herein is an information handling system, including: a chassis enclosure enclosing components of the information handling system; at least one PCIe component bay defined in the chassis enclosure; a host processing device contained inside the chassis enclosure, the host processing device being coupled to a system PCIe connector that is disposed within the PCIe component bay; and an adapter including a carrier received within a PCIe component bay of an information handling system chassis enclosure, the carrier having a distal end and a proximal end with an adapter cavity defined therebetween, a first PCIe adapter connector mechanically coupled to the carrier to face outward at the distal end of the carrier and being mechanically and electrically mated to the system PCIe connector with the proximal end of the carrier facing outward through a bay opening in the chassis enclosure. The adapter may further include: a second PCIe adapter connector mechanically and electrically mated to a PCIe connector of a PCIe expansion card received within the adapter cavity, and circuitry electrically coupled between the first PCIe adapter connector and the second PCIe adapter connector, the circuitry including conductors corresponding to signals of one or more PCIe signal lanes between the first PCIe adapter connector and the second PCIe adapter connector to electrically couple the host processing device to the PCIe expansion card through the system PCIe connector.

In another respect, disclosed herein is a method, including: inserting a distal end of an adapter into a PCIe component bay of an information handling system through a bay opening defined in a chassis enclosure of the information handling system, the adapter including a carrier having a distal end and a proximal end with an adapter cavity defined therebetween, a first PCIe adapter connector mechanically coupled to the carrier to face outward at the distal end of the carrier; and mechanically and electrically mating the first PCIe adapter connector to the system PCIe connector with the proximal end of the carrier facing outward through the bay opening in the chassis enclosure. The adapter may further include: a second PCIe adapter connector mechanically and electrically mated to a PCIe connector of a PCIe expansion card received within the adapter cavity, and circuitry electrically coupled between the first PCIe adapter connector and the second PCIe adapter connector, the circuitry including conductors corresponding to signals of one or more PCIe signal lanes between the first PCIe adapter connector and the second PCIe adapter connector to electrically couple a host processing device within the chassis enclosure to the PCIe expansion card through the system PCIe connector. The method may further include operating the host processing device in signal communication with the expansion card though the PCIe signal lanes between the first PCIe adapter connector and the second PCIe adapter connector with the adapter received in the PCIe component bay of the information handling system.

DESCRIPTION OF ILLUSTRATIVE EMBODIMENTS

Figure 1:
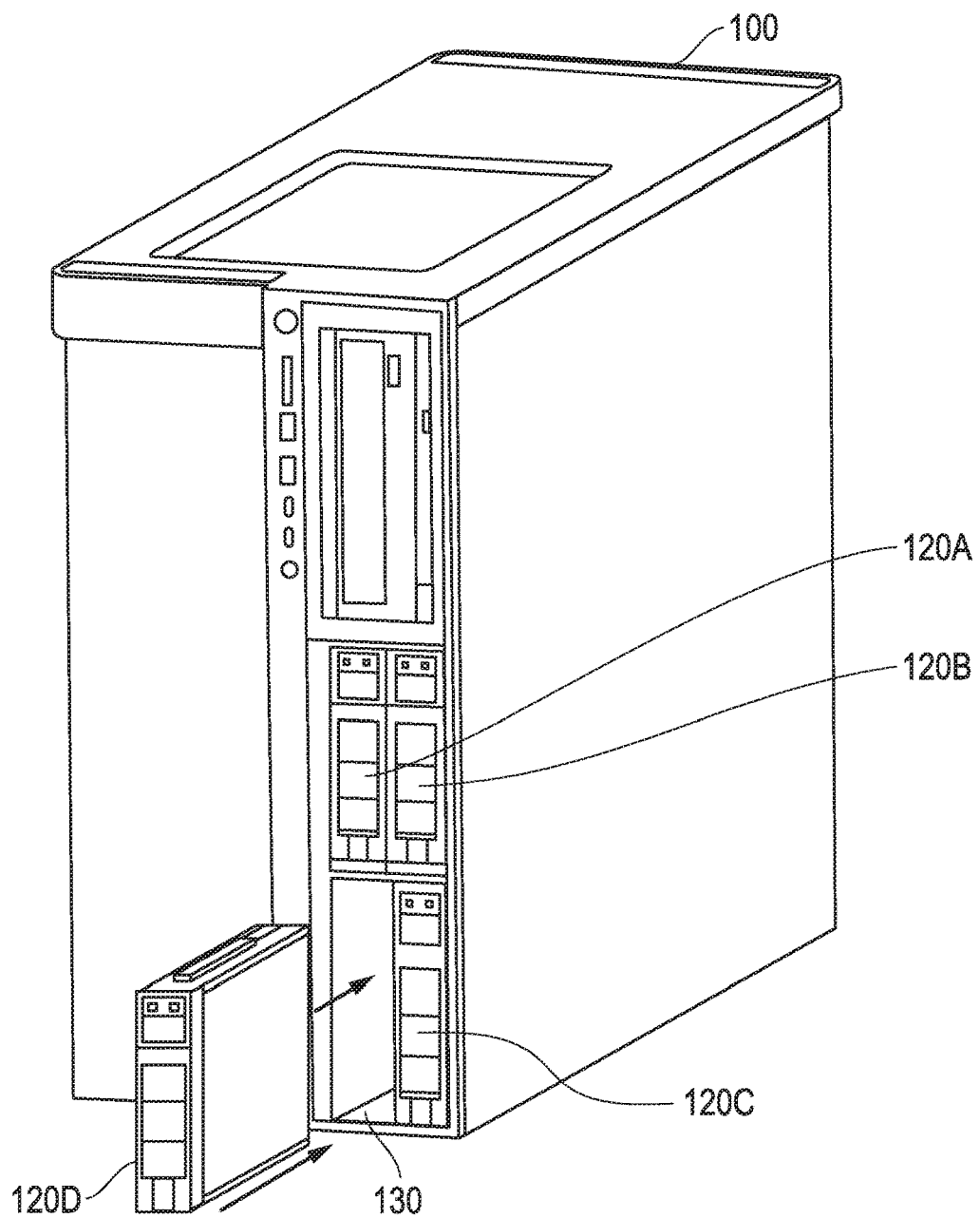
FIG. 1 illustrates conventional tower computer system.
Figure 2A:
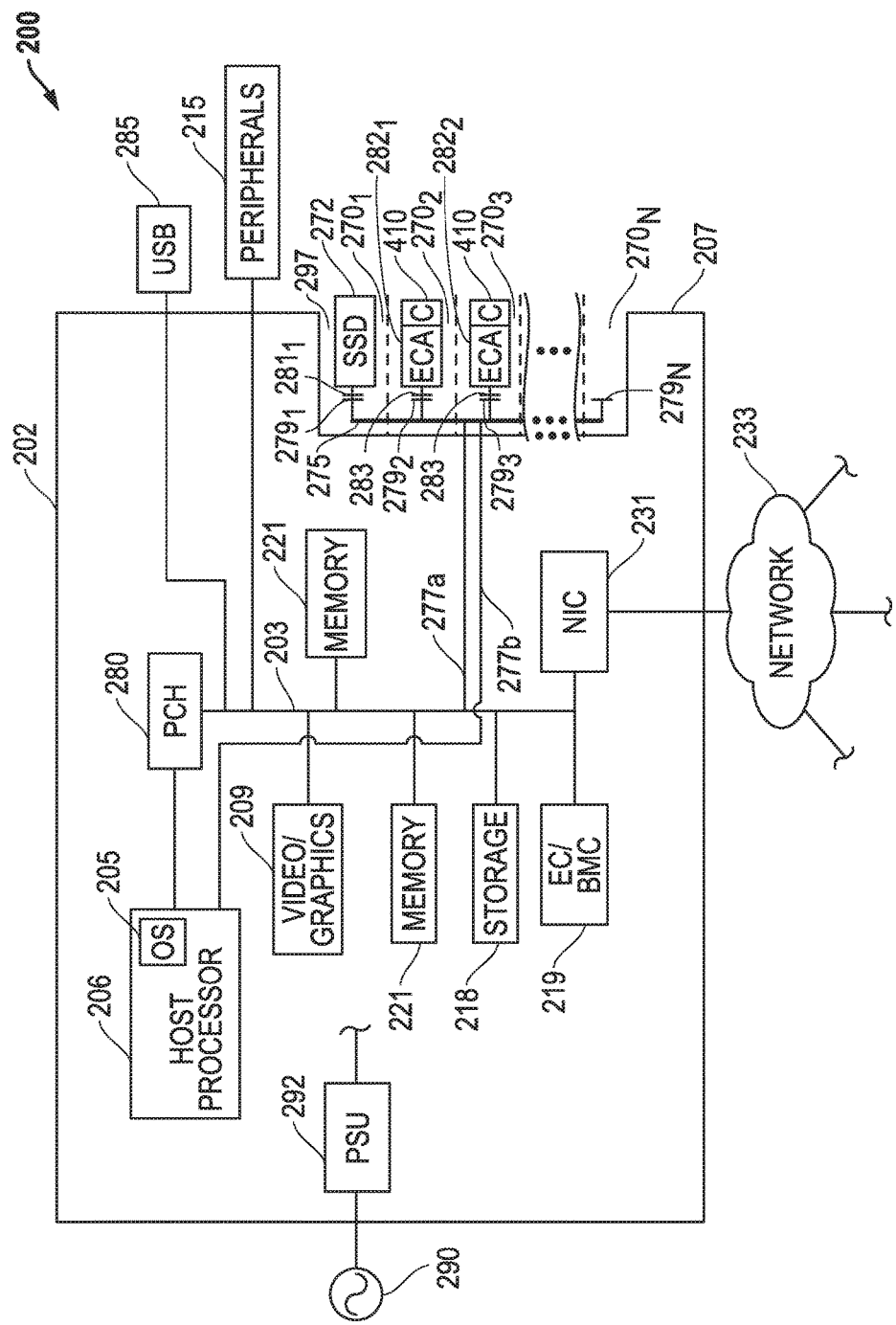
FIG. 2A illustrates a block diagram of an information handling system according to one exemplary embodiment of the disclosed adapters, systems and methods.

FIG. 2A is a block diagram of an information handling system 200 (e.g., such as a server or computer workstation) as it may be configured according to one exemplary embodiment. As shown, system 200 may include a chassis enclosure 202 that contains system components such as at least one host processing device/s 206 (e.g., AMD or Intel-based CPU such as Itanium or any other type of suitable host processing device), one or more buses or communication media 203 (e.g., PCIe bus, USB, SMBus, SATA, other appropriate data buses such as memory bus, etc.), video/graphics hardware (e.g., video adapter or graphics processor unit) 209, system volatile memory (e.g., DRAM) 221, internal storage 218 (non-volatile memory or other non-volatile memory storage device/s e.g., such as hard disk drive and/or optical drive, etc.), peripherals (keyboard, mouse, touchpad, video monitor, touchscreen, etc.) 215, and network interface controller (NIC) 231. As shown in the exemplary embodiment of FIG. 2A, an out-of-band processing device 219 (e.g., embedded controller "EC", baseboard management controller "BMC", etc.) may be optionally present that is a separate and independent processing device from in-band host processing device/s 206. Host processing device/s 206 may be configured to execute host OS 205 (e.g., Microsoft Windows-based OS, Linux-based OS, etc.), as well as system basic input/output system (BIOS) and various applications. In one embodiment, chassis enclosure 202 may be a sheet metal or sheet plastic enclosure (e.g., workstation chassis enclosure, desktop computer chassis enclosure, server chassis enclosure, etc. that surrounds and contains internal components of system 200 as shown in FIG. 2A.

In the illustrated embodiment, bus/es 203 provides a mechanism for the various components of system 200 to communicate and couple with one another. As shown, host processing device/s 206 may be coupled in on embodiment to bus/es 203 via embedded platform controller hub (PCH) 280 which may be present to facilitate input/output functions for the processing device/s 206 with various internal and external components. NIC 231 may be communicatively coupled to network 233 (e.g., Internet or corporate intranet) as shown to allow various components of system 200 to communicate with external and/or remote device/s across network 233. Other external devices, such as external universal serial bus (USB) device 285 may be coupled to processing device/s 206 via PCH 280 as shown. In this embodiment, information handling system 200 also includes power supply unit (PSU) 292 that is coupled to receive power from AC mains 290 and to perform appropriate power conversion and voltage regulation to produce regulated internal power 294 for use by power-consuming components of system 200.

Also shown in FIG. 2A is storage backplane printed circuit board (PCB) 275 that is coupled by PCIe bus 277 (e.g., one or more lanes of PCIe 3.0 or other generation of PCIe) to PCIe lanes of host processing device/s (e.g., CPU/s) 206 either directly to PCIe lanes of host processor/s 206 via bus 277b (separately from PCH 280) or alternatively via bus 277a and PCH 280. In this embodiment, storage backplane 275 includes multiple blind mate PCIe interface (e.g., SSD-compatible) bay connectors $279_1$ to $279_N$ of the same type that extend outwardly in perpendicular relation to the plane of the storage backplane 275, and thus extend into an internal cavity of respective multiple modular PCIe component (e.g., SSD) bays $270_1$ to $270_N$ from the distal side (or rear) of each bay 270. In this regard, each of multiple PCIe component bays 270 is dimensionally configured with a cavity for receiving a respective PCIe peripheral component 272 such as a non-volatile memory SSD carrier (e.g., 3.5 inch form factor SSD carrier, 2.5 inch form factor SSD carrier, etc.) that may be inserted through a bay opening 297 defined in the chassis enclosure 202 of system 200. Each PCIe peripheral component 272 is provided with a PCIe peripheral component connector 281 that is configured to correspond to and mate with one of blind mate PCIe interface bay connectors 279. Mating connectors 279 and 281 may be of any blind mate connector type (e.g., having lead in/gathering feature/s) that is configured to meet the electrical signal integrity requirements (e.g., insertion loss, crosstalk, return loss, etc.) to pass PCIe clock rates, and may be connectors configured to conduct PCIe buses of various widths (×1, ×2, ×4, ×8, etc.), depending on the size (pin count) of the particular connectors.

In the embodiment of FIG. 2A, a PCIe peripheral component 272 in the form of a SSD carrier (containing a SSD) is shown inserted into a cavity of PCIe component bay $270_1$ with its PCIe peripheral component connector 281 electrically connected to mating PCIe interface bay connector $279_1$ of PCIe component bay $270_1$. As shown, expansion card adapters 282 with respective PCIe expansion cards 410 are each inserted into cavities of respective PCIe component bays $270_2$ and $270_3$. Each of expansion card adapters 282 may have a respective first PCIe adapter connector 283 that is the same type and configuration of PCIe connector as PCIe peripheral component connector 281 of PCIe peripheral component 272 so that a PCIe adapter connector 283 is interchangeable with a PCIe peripheral component connector 281 for connection with a system PCIe interface bay connector 279 in each bay 270. In FIG. 2A, PCIe adapter connector 283 of each expansion card adapter 282 is electrically connected to a corresponding mating PCIe interface bay connector $279_2$ or $279_3$ of respective PCIe component bays $270_2$ or $270_3$. The cavity of PCIe component bays $270_N$ is empty, and ready to receive a PCIe peripheral component 272 (such as SSD carrier) or expansion card adapter 282, as chosen by a user of system 200. In this embodiment, a bay opening 297 continuous with the cavity of each PCIe component bays 270 is defined in a front surface 207 of chassis enclosure 202 that is for receiving PCIe peripheral components 272 and expansion card adapters 282. In this regard, a single bay opening 297 may be provided for multiple PCIe component bays 270 as shown, or may alternatively a separate distinct bay opening 297 may be provided that corresponds to each of multiple PCIe component bays 270. It will also be understood that PCIe component bays 270 with bay openings 297 defined in one or more other chassis surfaces (e.g., rear chassis surface, side or top chassis surface, etc.) are alternatively possible in other embodiments. Moreover, it is also possible that in another embodiment an information handling system may be provided with only a single PCIe component bay 270.

In the embodiment of FIG. 2A, example types of suitable mating connectors 279 and 281/283 include, but are not limited to, SFF-8639 (U.2) connectors, or other suitable connector of sufficient pin count, mechanical features and electrical performance, etc. For example, U.2 connectors having multiple pins for connecting four PCIe lanes and other signals (SAS, SATA, power, SMBus, etc.) to a mating connector 281 of a PCIe peripheral component 272 (such as SSD carrier) and/or mating connector 283 of an expansion card adapter 282 may be employed. PCIe adapter connector 283 may be configured to be of the same type of PCIe connector (or otherwise to operatively mate with) each of PCIe interface bay connectors 279.

It will be understood that the embodiment of FIG. 2A is exemplary only, and that an information handling system may be provided with one or more processing devices that may perform the functions of host processing device/s 206, EC/BMC 219, etc. It will also be understood that the particular configuration of FIG. 2 is exemplary only, and that other information handling system architectures may be employed in the practice of the disclosed adapters, systems and methods.

Figure 2B:
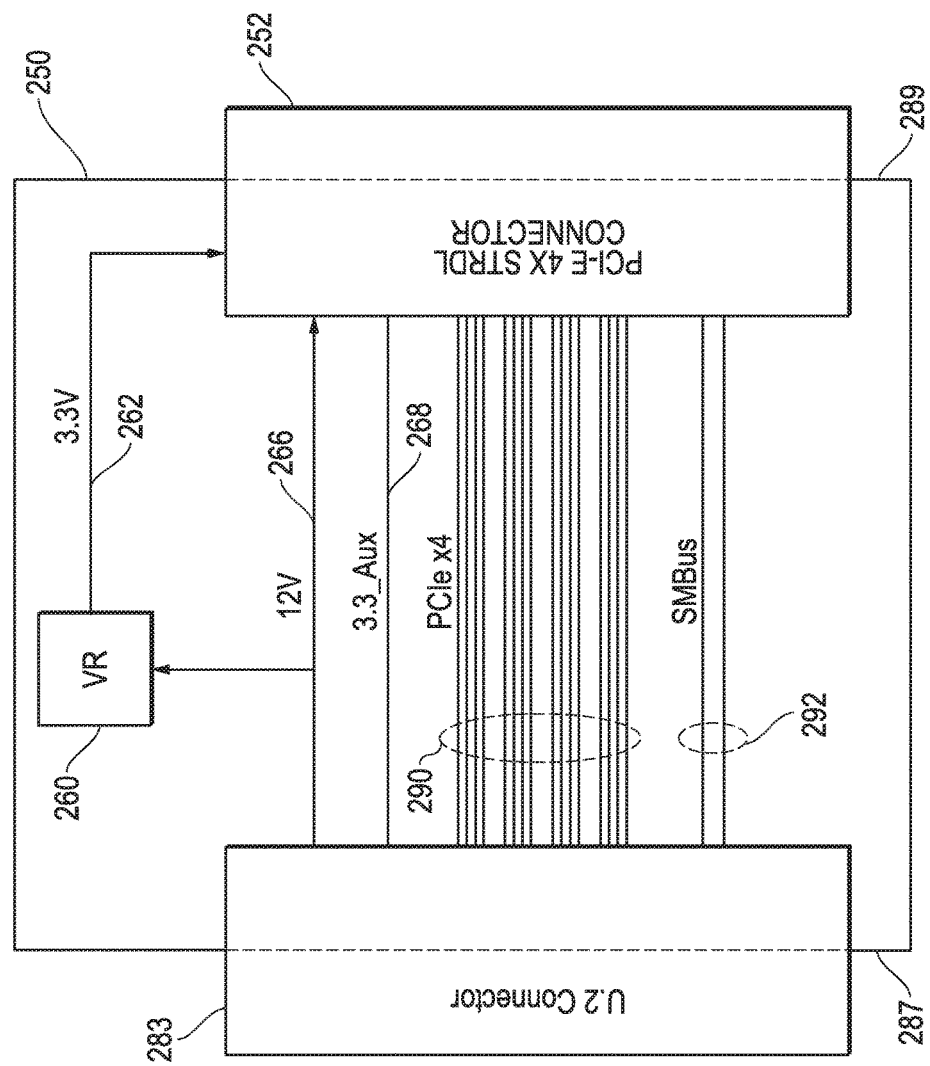
FIG. 2B illustrates a simplified block diagram of an interface printed circuit board (PCB) card according to one exemplary embodiment of the disclosed adapters, systems and methods.

FIG. 2B illustrates a simplified block diagram of an interface printed circuit board (PCB) card 250 that may be employed in one embodiment as part of an expansion card adapter 282. In this embodiment interface card 250 includes a Molex-style U.2 PCIe adapter connector 283 disposed at a first edge 287 of card 250 and configured to electrically connect with a PCIe interface bay connector 279 of a PCIe component bay 270. However, a system-side first edge 287 of an interface card 250 may alternatively be configured with other types or configurations of PCIe adapter connectors 283 to fit (and mate with) the characteristics of a PCIe interface bay connector 279 of a given information handling system 200. In FIG. 2B, interface card 250 also includes a second PCIe adapter connector in the form of an industry standard PCIe card edge (straddle or slot) expansion card connector 252 disposed at a second edge 289 of card 250 and configured to receive a card edge of a PCIe expansion card 410 to electrically connect with card edge pins of the PCIe expansion card in a manner as described further herein.

As shown in FIG. 2B, interface card 250 includes interface circuitry in the form of signal conductors (e.g., conductive traces) that interconnect individual pins of PCIe adapter connector 283 with respective individual pins of PCIe expansion card connector 252. In the embodiment of FIG. 2B, PCIe-related traces are provided that include two interface card signal traces 292 for an optional two-wire single-ended SMBus, sixteen signal traces 290 that form four PCIe lanes 290 that each includes two differential signaling pairs (one pair for receiving data and the other for transmitting) or four signal traces per lane, and a low power (e.g., less than or equal to 375 milliampere) 3.3 volt auxiliary power rail trace 268 that conducts system power received from PCIe interface bay connector 279 of system 200 via PCIe adapter connector 283 for sideband communication via SMBus. Also present as interface circuitry on interface card 250 is 12 volt power rail conductor in the form of trace 266 that conducts system power provided by PCIe interface bay connector 279 of system 200 when it is connected to PCIe adapter connector 283, and that is otherwise employed for powering circuitry of a conventional PCIe peripheral component 272 (such as SDD carrier with SSD) when such is connected to a PCIe interface bay connector 279 of a PCIe component bay 270. In one embodiment PCB interface card 250 may be manufactured with low-loss PCB material (e.g., low loss PCB material with low insertion loss such as Meg-6NE, Tachyon, etc.) and careful trace geometries (e.g., trace impedance, insertion loss, etc.) to maximize electrical signal integrity performance to support PCIe Gen 3 speeds.

In the embodiment of FIG. 2B, additional circuitry is present on interface card 250 to furnish required higher amperage 3.3 volt power from system PSU 292 (and any required intervening system voltage regulation circuitry) and PCIe interface bay connector 279 via PCIe adapter connector 283 to a PCIe expansion card 410 that is to be connected to expansion PCIe expansion card connector 252. This additional circuitry includes a voltage regulator (VR) 260 that is coupled by conductors (e.g., conductive traces) to receive and convert 12 volt power taken from power rail trace 266 to 3.3 volt power that is provided by power rail trace 262 to PCIe expansion card connector 252, e.g., to meet the voltage and minimum power requirements of power-consuming circuitry of a standard PCIe expansion card 410 that cannot be met by low power 3.3 volt auxiliary power rail trace 268 that provides a maximum of 375 milliamperes. It will be understood that an interface card 250 may be provided with one or more VRs 260 that convert system power of a first voltage received from a PCIe interface bay connector 279 via PCIe adapter connector 283 to VR output power of any other suitable greater or lesser second voltage and suitable amperage for supplying via one or more adapter power rail trace/s 262 to a PCIe expansion card connector 252 and power-consuming circuitry of an electrically-coupled PCIe expansion card 410.

In the illustrated embodiment of FIG. 2B, VR 260 may also provide power at the second voltage to adapter power rail trace 262 with a higher power capacity (higher wattage or maximum amperage) than the 375 milliampere-maximum 3.3 volt power provided from system 200 via mated connectors 279 and 283 to auxiliary power rail trace 268. In one exemplary embodiment, VR 260 may be so coupled to convert 12 Volt system power received from power trace 266 to 3.3 Volt power for trace 262 that has a maximum amperage that is greater than the maximum amperage (375 milliamperes) of the 3.3 Volt auxiliary rail 268 provided by system 200, e.g., so that VR 260 may output power from greater than 375 milliamperes up to 3 amperes in one embodiment. In such an embodiment, it will be understood that the current actually drawn from the VR 260 via power trace 262 at any time may be from 0 to 3 amperes depending on the requirements of the PCIe expansion card coupled to PCIe expansion card connector 252. Moreover, the voltage and amperage values of this embodiment are exemplary only, and may vary according to the characteristics of a given application.

Figure 3:
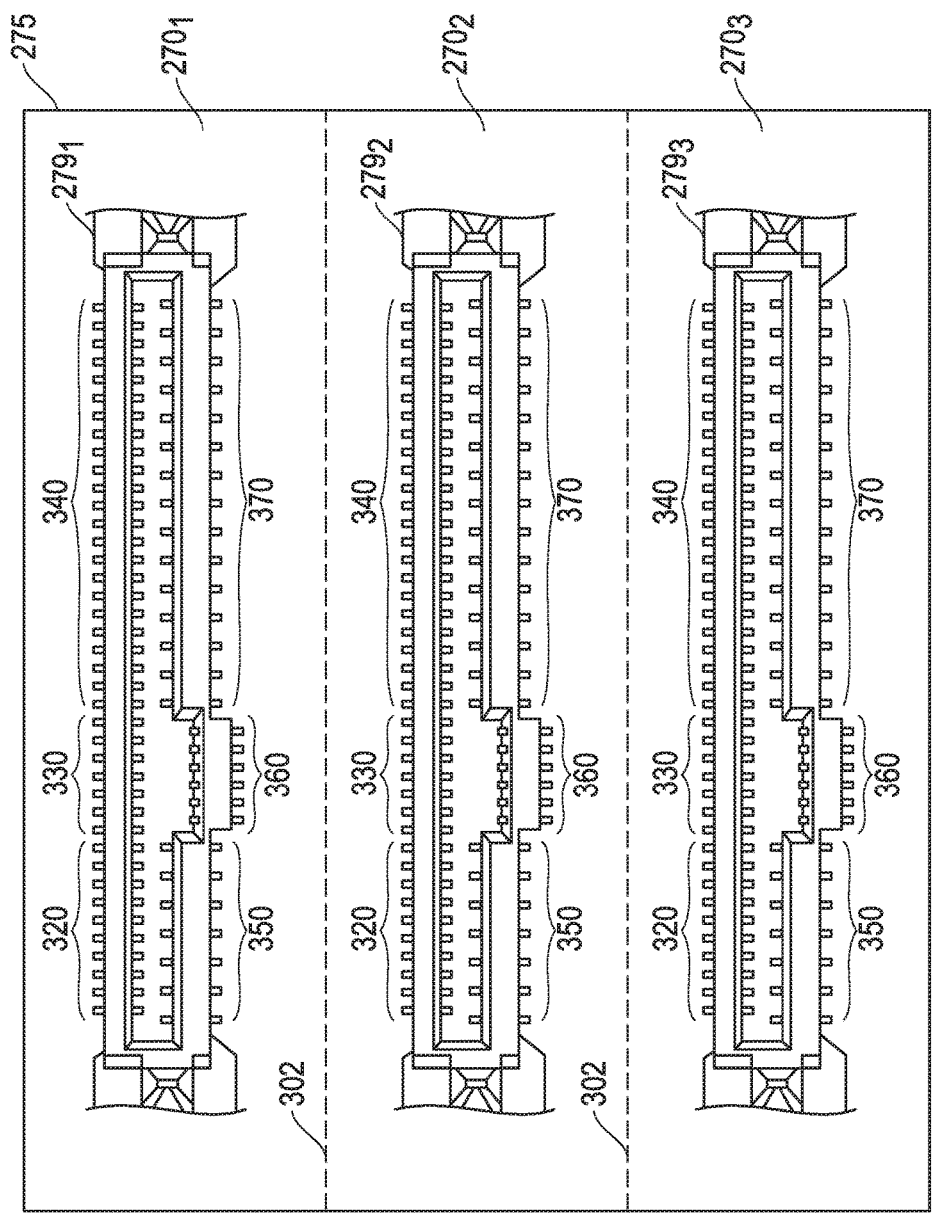
FIG. 3 illustrates a side view of storage backplane card with PCIe interface bay connectors according to one exemplary embodiment of the disclosed adapters, systems and methods.

FIG. 3 illustrates a side view of a planar surface of storage backplane card 275 as it may be configured in one exemplary embodiment to support three PCIe component bays 270 of an information handling system 200, with dashed lines 302 represent the dividing line between adjacent PCIe component bays 270 (shown not to scale) as viewed from the front of the bays 270. In this regard, bay openings 297 may be open and contiguous with each other as shown, or may be optionally separated from each other by walls. As shown in FIG. 3, each of three blind mate U.2 PCIe interface bay connectors $279_1$ to $279_3$ is mechanically coupled to extend outwardly in perpendicular relation to the plane of the storage backplane 275, e.g., in a position to interchangeably receive either mating U.2 PCIe peripheral component connectors 281 of a PCIe peripheral component 272 (such as SSD carrier) or mating U.2 PCIe adapter connector 283 of an expansion card adapter 282 that is inserted connector side first into any of the PCIe component bays 270 from the front of the bay 270. In the illustrated embodiment, each of PCIe interface bay connectors 279 is U.2 connector in which fifteen pins 370 are power and SATA express, six pins 360 are PCI sideband, seven pins 350 are Serial-attached SCSI (SAS)/Serial AT Attachment (SATA)/SATA Express first port, ten pins 320 are PCIe lane 0, seven pins 330 are SAS/SATA Express second port, and 23 pins 340 are PCIe lanes 1 to 3 with sideband. It will be understood that the dimensional shape and pin configuration of the illustrated U.2 connectors 279 are exemplary only, and that the disclosed adapters, systems and methods may be implemented with other information handling systems utilizing other types of SSD connectors as described elsewhere herein.

Figure 4A:
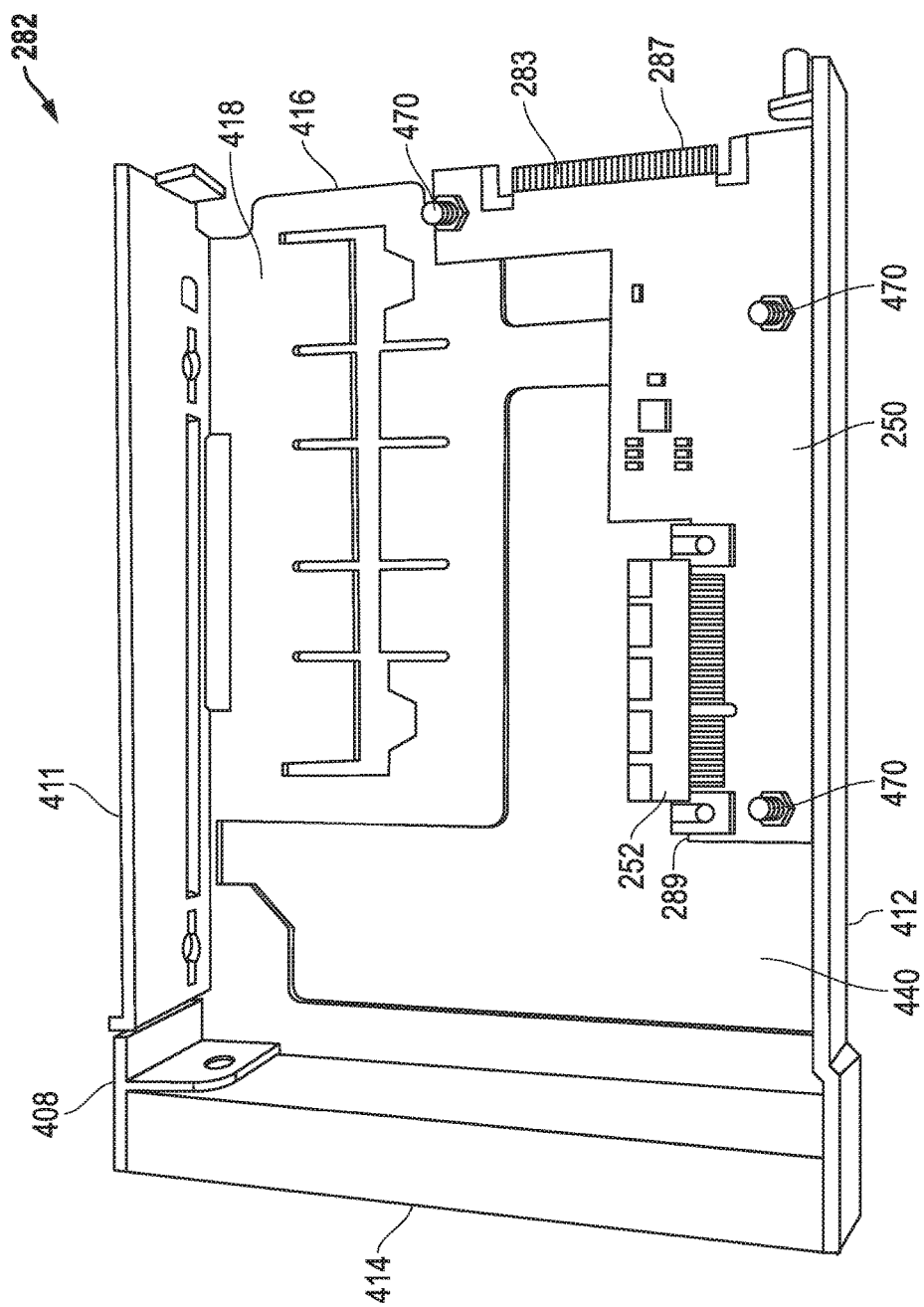
FIG. 4A illustrates a side perspective view of an expansion card adapter according to one exemplary embodiment of the disclosed adapters, systems and methods.

FIG. 4A illustrates a side perspective view of an expansion card adapter 282 according one exemplary embodiment of the disclosed adapters, systems and methods. As shown in FIG. 4A, adapter 282 includes a mechanical adapter carrier 408 (e.g., sheet metal, sheet plastic, etc.) that is shaped and dimensionally configured to be received in an PCIe component bay 270 of an information handling system. An adapter carrier 408 may be configured, for example, for insertion into a PCIe component bay 270 that is dimensionally configured as a 3.5" SSD bay 270, it being understood that an adapter carrier 408 may be dimensionally configured with any other alternative shape and/or dimensions that are suitable for insertion into other types and sizes of PCIe component bays 270 (e.g., such as 2.5" SSD bays).

In the embodiment of FIG. 4A, adapter carrier 408 of expansion card adapter 282 has an adapter cavity 440 defined between front (proximal) end 414, rear (distal) end 416, two opposing sides 411 and 412, and base 418 of adapter carrier 408. In FIG. 4A, an interface card 250 is received and mechanically coupled within cavity 440 of adapter carrier 408 in this case via fasteners 470 (e.g., nuts and bolts, screws, rivets etc.) that attach to base 418, although any other suitable attachment method is possible. As previously described, interface card 250 may in one embodiment be a PCB that has the characteristics of low-loss PCB material (e.g., low loss PCB material with low insertion loss such as Meg-6NE, Tachyon, etc.) and careful trace geometries (e.g., trace impedance, insertion loss, etc.) to maximize electrical signal integrity performance to support PCIe Gen 3 speeds In the illustrated embodiment, a rearward-facing PCIe adapter connector 283 is disposed on interface card 250 at the rear end 416 of adapter carrier 408 in a position with rearward-facing pins that is suitable for mating and interconnection with one of PCIe interface bay connectors 279 of FIG. 3 when expansion card adapter 282 is inserted into any one of PCIe component bays 270 by a user. As further shown, a PCIe expansion card connector 252 is a card edge connector that is disposed on a second edge 289 of card 250 (in this embodiment longitudinal axis of second edge 289 is oriented perpendicular to longitudinal axis of first edge 287) and PCIe expansion card connector 252 includes a socket configured to receive a mating edge connector 415 (with its connector traces) of a PCIe expansion card 410 to electrically connect with the edge connector traces of the PCIe expansion card 410 as illustrated in FIG. 4C. In the illustrated embodiment, PCIe expansion card connector 252 is a x4 PCIe slot card edge connector that is capable of receiving edge traces of a mating edge connector 415 of same or shorter length as illustrated in FIG. 4C. However, other lengths of PCIe slot connectors may be alternatively employed as PCIe expansion card connector 252. Connectors 283 and 252 connect to circuit traces of interface card 250 in a manner as described in relation to FIGS. 2B and 3.

Figure 4B:
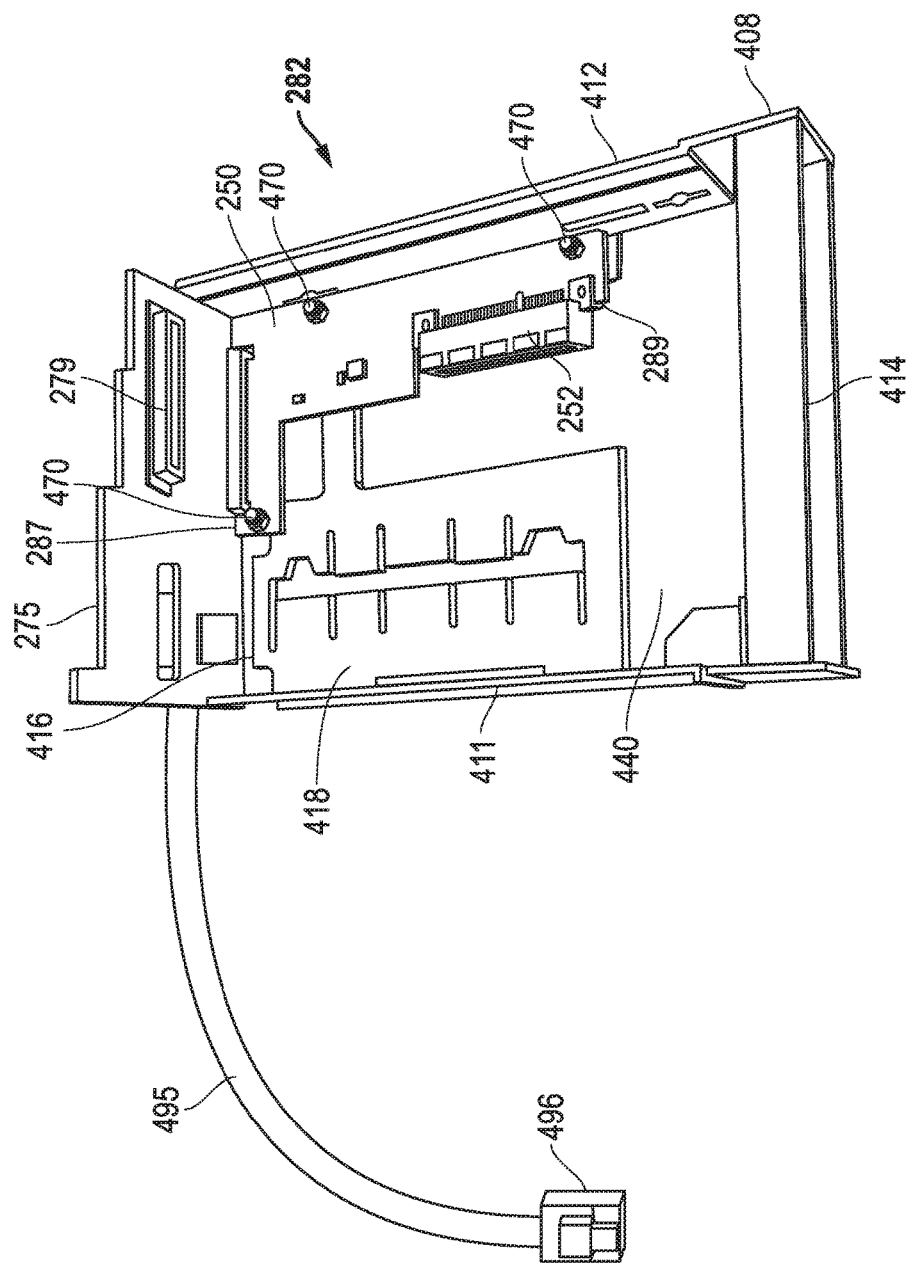
FIG. 4B illustrates a front perspective view of an expansion card adapter operatively coupled to a storage backplane according to one exemplary embodiment of the disclosed adapters, systems and methods.
Figure 4C:
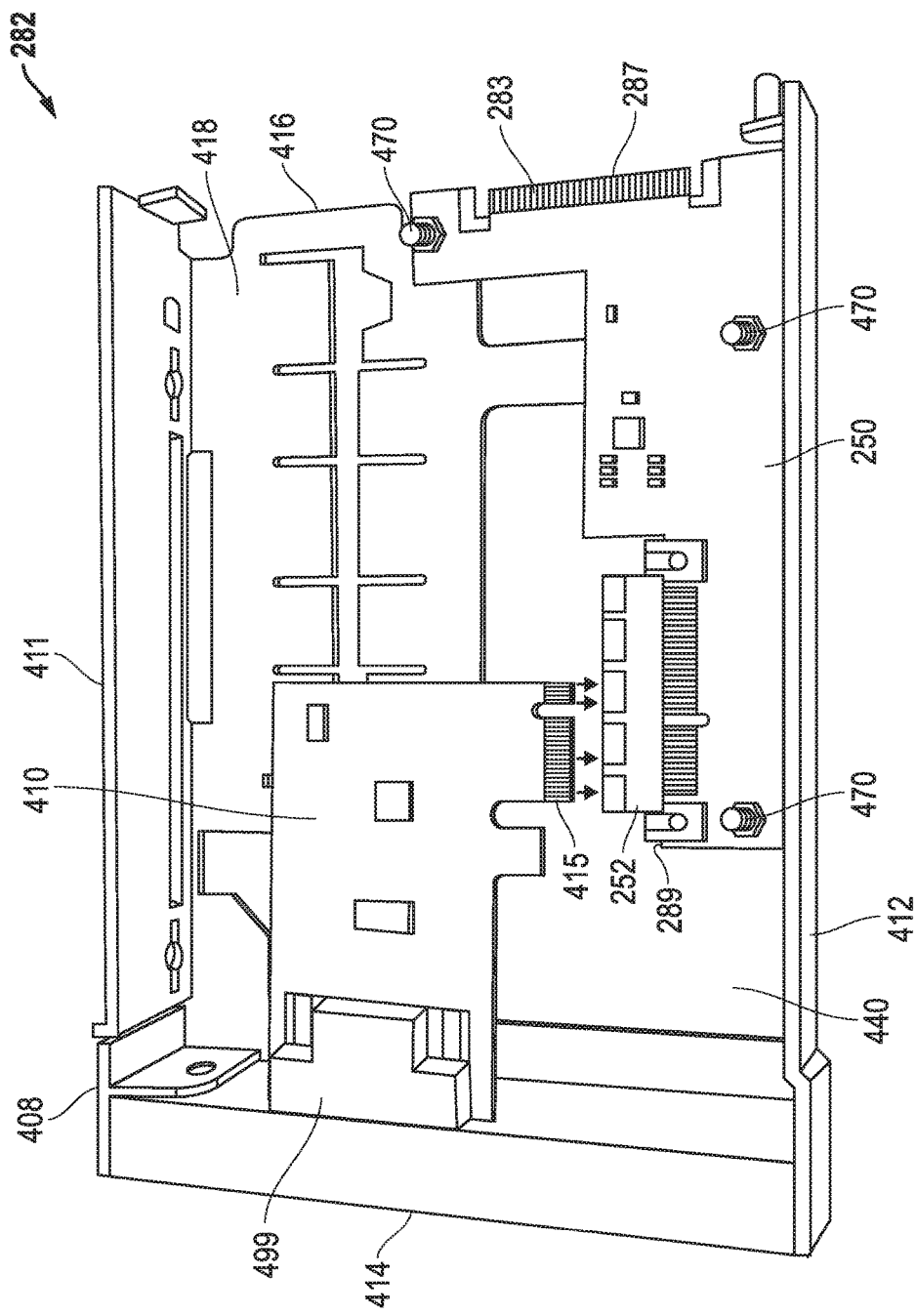
FIG. 4C illustrates a side perspective view of an expansion card adapter according to one exemplary embodiment of the disclosed adapters, systems and methods.
Figure 6:
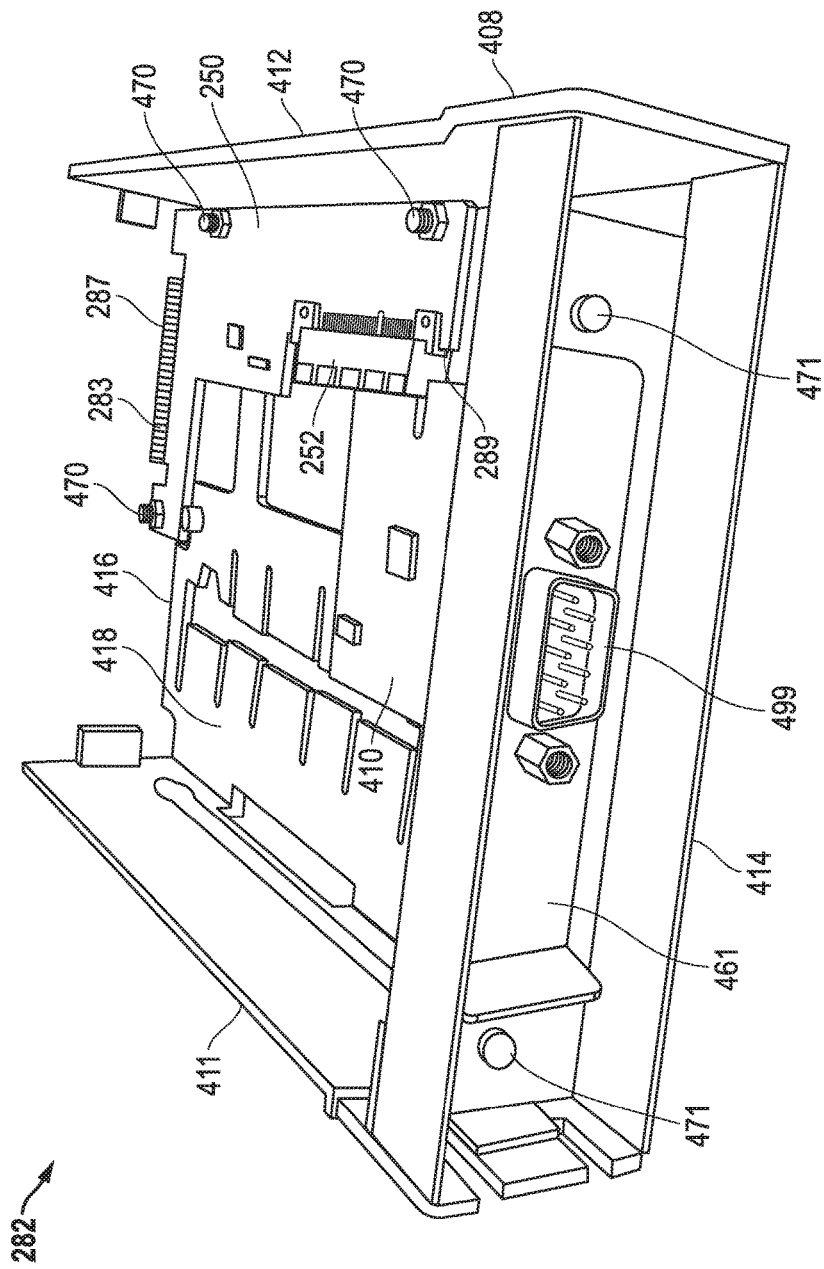
FIG. 6 illustrates a front perspective view of an expansion card adapter with expansion card according to one exemplary embodiment of the disclosed adapters, systems and methods.

FIG. 4B illustrates a front perspective view of expansion card adapter 282 operatively coupled to a storage backplane 275 that is removed from system 200 for purposes of illustration. As shown in FIG. 4B, a conductor 495 extends from backplane 275 for connection to host processing unit 206 via connector 496 that may be attached to mating connector on a system motherboard of information handling system 200. FIG. 4C illustrates a PCIe expansion card 410 with a x4 PCIe edge connector 415 that is positioned within adapter cavity 440 of expansion card adapter 282 for insertion into slot of PCIe expansion card connector 252 in the direction of the arrows. As shown in FIG. 4C, interface card 250 may be positioned with the longitudinal axis of the slot of its PCIe expansion card connector 252 oriented perpendicular to the longitudinal axis of the connector edge of its PCIe adapter connector 283 such that external interface component/s 499 (e.g., data connectors, user buttons, lights, audio and/or video jacks, antenna connections, etc.) of a mated PCIe expansion card 410 are positioned to face outward and accessible to a user of an information handling system 200 through bay opening 297 which remains open during system operation to allow user access to the interface component/s 499, e.g., as shown in FIG. 6.

In one exemplary embodiment, PCIe expansion card 410 may have maximum outer dimensions of 130 millimeter long×84 millimeter high to fit within a correspondingly sized adapter cavity 440 of adapter carrier 408, although adapter carriers having smaller or larger adapter cavities may be provided in other embodiments, e.g., for accepting PCIe expansion cards having smaller or larger outer dimensions, respectively. It will be understood that any other size and length PCIe expansion card 410 (e.g., with more or less PCIe lanes) having a suitable connector length for mating with PCIe expansion card connector 252 may be alternately inserted within adapter carrier 408 as long as it has outer dimensions that fit within the maximum inner dimensions of a given adapter cavity 440 in a position to be operatively mated to PCIe expansion card connector 252.

Figure 8:
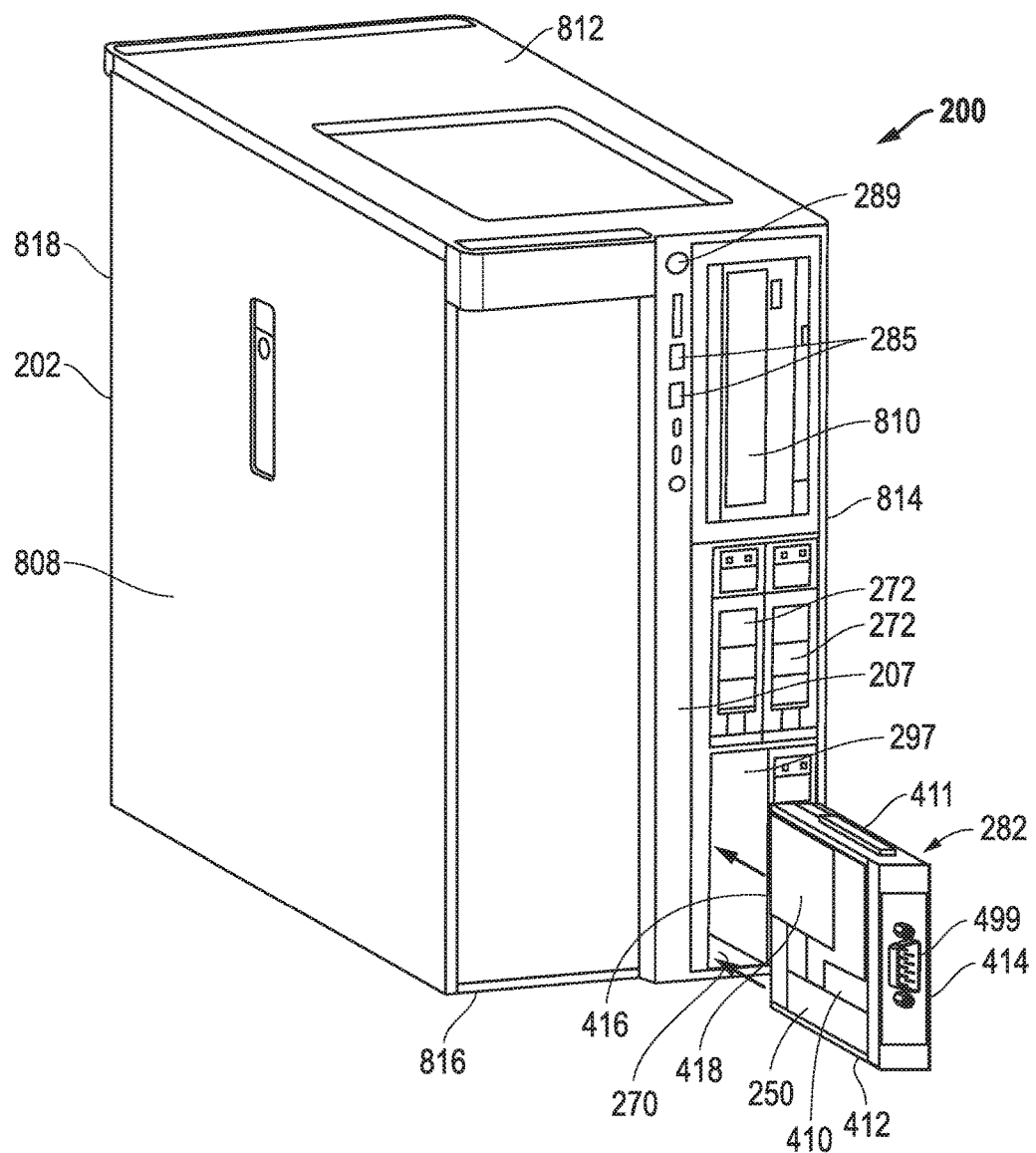
FIG. 8 illustrates a front prospective view of a tower information handling system and expansion card adapter positioned adjacent an open PCIe component bay according to one exemplary embodiment of the disclosed adapters, systems and methods.

Advantageously, different types of PCIe expansion cards 410 may be interchanged within an expansion card adapter 282, e.g., to allow a user to remove an expansion card adapter 282 from a PCIe component bay 270 and replace the existing PCIe expansion card 410 with a new and different type PCIe expansion card 410 and then re-inset the expansion card adapter 282 with the new expansion card 410 into the PCIe component bay 270 without opening the chassis enclosure 202, e.g., by simply inserting the expansion card adapter 282 through the front bay opening 297 into the PCIe component bay 270 without requiring the use of any other opening in the chassis enclosure or any other access to the interior of the chassis enclosure 202. Thus, an expansion card adapter 282 may be inserted with its expansion card 410 through bay opening 297 into the PCIe component bay 270 as shown in FIG. 8 without removing any chassis enclosure cover, chassis enclosure panel, or requiring any other access to the interior of the chassis enclosure 202 from any other opening in front surface 207 or enclosed sides 808, 812, 814, 816 or 818 of chassis enclosure 202 besides the bay opening 297. The expansion card adapter 282 may be removed with its expansion card 410 through bay opening 297 in a reverse manner.

Figure 5:
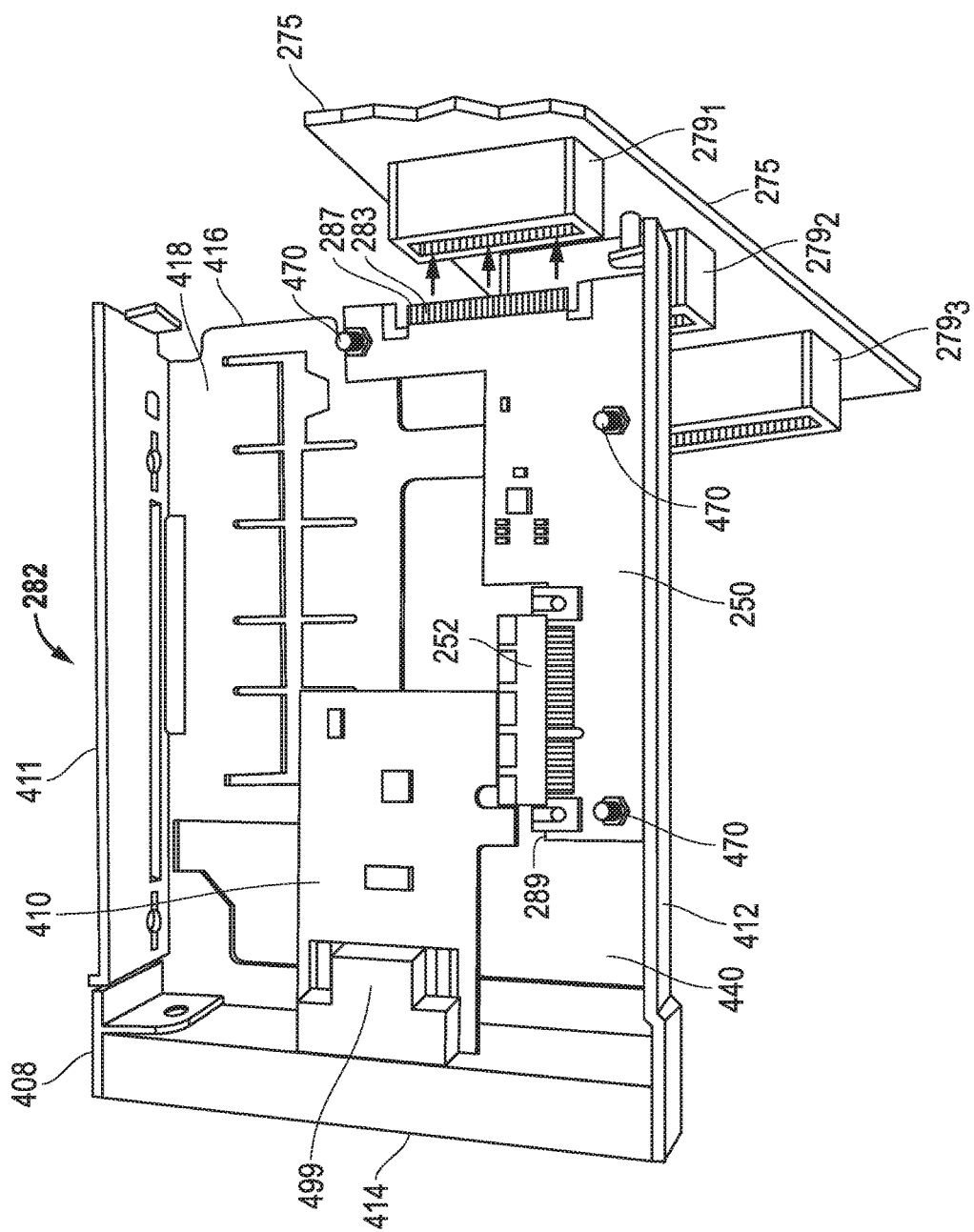
FIG. 5 illustrates a side perspective view of an expansion card adapter with expansion card and system storage backplane according to one exemplary embodiment of the disclosed adapters, systems and methods.
Figure 7:
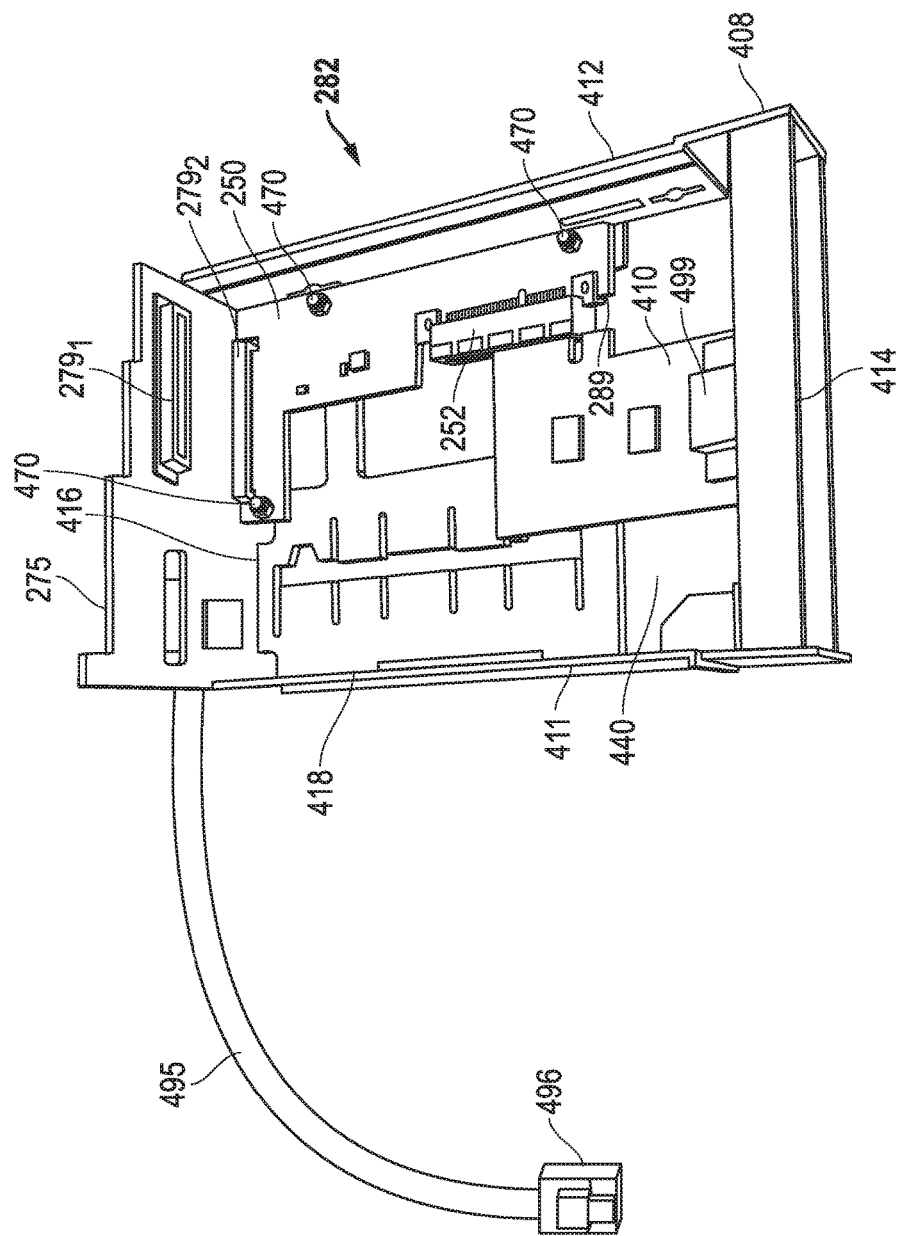
FIG. 7 illustrates a front perspective view of an expansion card adapter with expansion card operatively coupled to a storage backplane according to one exemplary embodiment of the disclosed adapters, systems and methods.

FIG. 5 illustrates a side perspective view of one embodiment of an expansion card adapter 282 with a fully mated PCIe expansion card 410 as it may be positioned for connection to storage backplane 275 in the direction of the arrows, e.g., within a cavity of a PCIe component bay 270 of information handling system 200. Expansion card adapter 282 and storage backplane 275 are illustrated removed from system 200 for purposes of illustration. FIG. 6 illustrates a front perspective view of expansion card adapter 282 with a fully mated PCIe expansion card 410, showing how external interface components 499 (serial data connector and threaded connector securing apertures) of the expansion card 410 are positioned for user access when edge connector 415 of expansion card 410 is fully mated to corresponding PCIe expansion card connector 252. As previously described, interface card 250 is fixedly secured to carrier 408 by fasteners 470, and front side 461 of interface card 250 may be secured by fasteners 471 to front end 414 of carrier 408 so that external interface components 499 of expansion card 410 are firmly held in this position. FIG. 7 illustrates a front perspective view of expansion card adapter 282 with a fully mated PCIe expansion card 410 and operatively coupled to a storage backplane 275 that is removed from system 200 for purposes of illustration.

Figure 9:
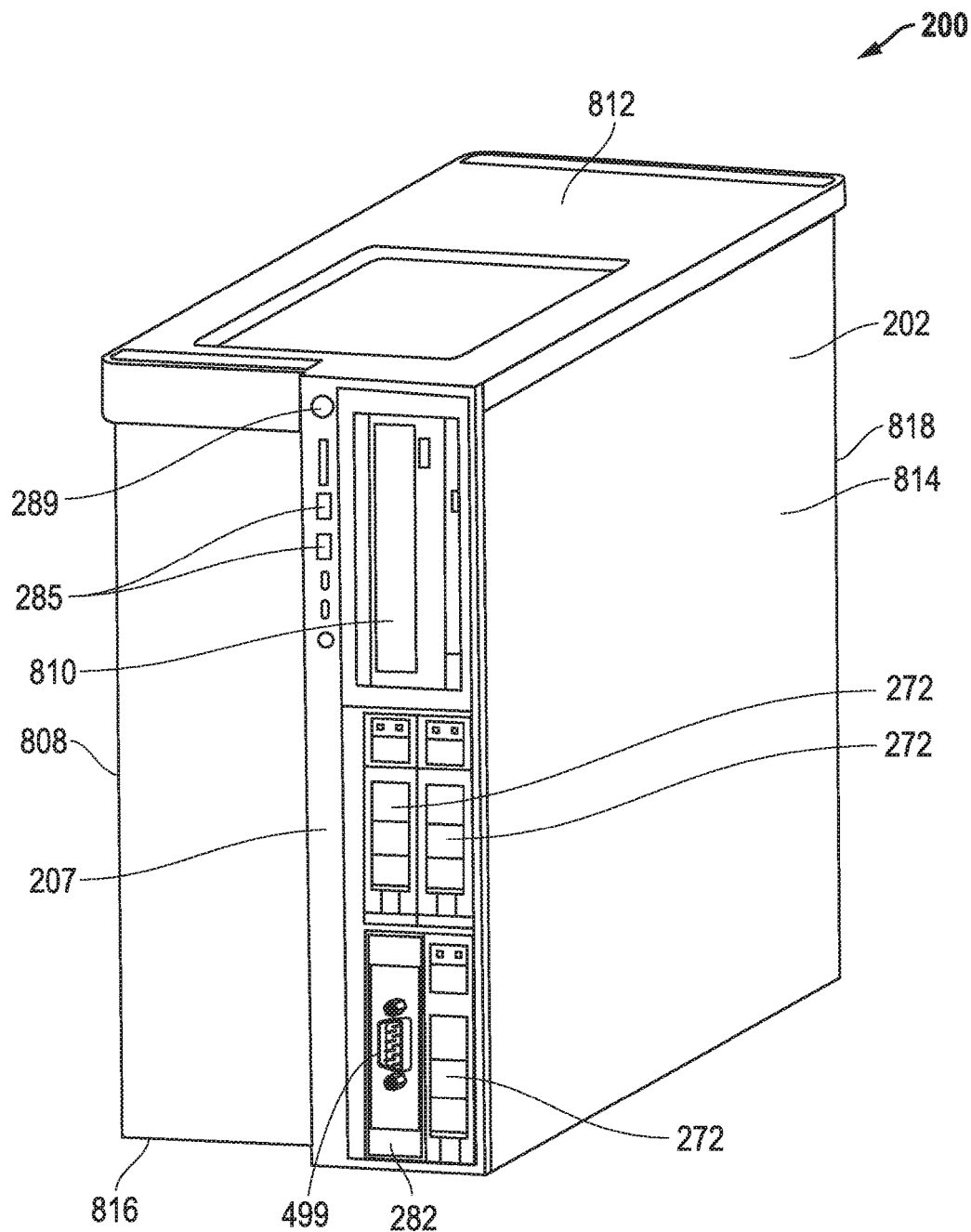
FIG. 9 illustrates a front prospective view of a tower information handling system with expansion card adapter installed within a PCIe component bay according to one exemplary embodiment of the disclosed adapters, systems and methods.

FIGS. 8 and 9 illustrate different front perspective views of a tower information handling system 200 that has been provided with multiple front-access PCIe component bays (flex-bays) 270 that are open to the front surface 207 of chassis enclosure 202 of system 200. As shown a system 200 may include other user-accessible devices, such as optical drive 810, USB ports 285, power button 289, etc. Each of PCIe component bays 270 are configured to accept a PCIe peripheral component 272 that is accessible to a user, so as to allow multiple PCIe peripheral components 272 to be installed and/or different PCIe peripheral components 272 to be swapped into and out of the computer system 100 by the user. In FIG. 8, an expansion card adapter 282 that is dimensionally configured similar to PCIe peripheral components 272 (e.g., similar to 3.5" or 2.5" SSD carriers) is positioned for insertion with its PCIe expansion card 410 into the opening 297 of one of PCIe component bays 270 in the front surface 207 of chassis enclosure 202 in the direction of the arrow as shown. In FIG. 9, the SSD expansion card adapter 282 is shown fully inserted and seated within one of SSD bays 130 with its PCIe adapter connector 283 mated to one of blind mate PCIe interface bay connectors 279 in the rear side of the SSD bay 130 so that its PCIe expansion card 410 is connected via the PCIe adapter connector 283 and PCIe interface bay connector 279 in signal communication with the host processing device 206 via storage backplane 275 of system 200.

It will also be understood that one or more of the tasks, functions, or methodologies described herein (e.g., including those described herein for components 206, 209, 231, 280, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions are configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more steps of the methodologies disclosed herein. In one embodiment, a group of such processing devices may be selected from the group consisting of CPU, controller, microcontroller, microprocessor, FPGA, CPLD and ASIC. The computer program of instructions may include an ordered listing of executable instructions for implementing logical functions in an information handling system or component thereof. The executable instructions may include a plurality of code segments operable to instruct components of an information handling system to perform the methodologies disclosed herein. It will also be understood that one or more steps of the present methodologies may be employed in one or more code segments of the computer program. For example, a code segment executed by the information handling system may include one or more steps of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed adapters, systems and methods may be utilized in various combinations and/or independently. Thus the invention is not limited to only those combinations shown herein, but rather may include other combinations.

What is claimed is:

1. An adapter, comprising:
  an expansion card carrier dimensionally configured to be received in place of a non-volatile memory solid state drive (SSD) carrier within a SSD bay of an information handling system chassis enclosure, the expansion card carrier having a distal end a proximal end with an adapter cavity defined therebetween;
  a first PCIe adapter connector mechanically coupled to the expansion card carrier to face outward at the distal end of the expansion card carrier in position to mechanically and electrically mate with a system PCIe connector of the information handling system that is disposed within the PCIe component bay;
  a second PCIe adapter connector mechanically coupled to the expansion card carrier to face into the adapter cavity to mechanically and electrically mate with a PCIe connector of a PCIe expansion card received within the adapter cavity; and circuitry electrically coupled between the first PCIe adapter connector and the second PCIe adapter connector, the circuitry comprising conductors corresponding to signals of one or more PCIe signal lanes between the first PCIe adapter connector and the second PCIe adapter connector.

2. The adapter of claim 1, further comprising the PCIe expansion card received within the adapter cavity and mechanically and electrically mated to the second PCIe adapter connector.

3. The adapter of claim 2, where the PCIe connector of the PCIe expansion card is a ×4 PCIe edge straddle mount connector.

4. The adapter of claim 2, where the PCIe expansion card comprises an external interface; and where the external interface is exposed at the proximal end of the expansion card carrier.

5. The adapter of claim 1, where the circuitry comprises conductive traces on a printed circuit board (PCB) that are electrically coupled between the first PCIe adapter connector and the second PCIe adapter connector.

6. The adapter of claim 1, where the circuitry further comprises at least one conductor corresponding to a first power rail coupled between the first PCIe adapter connector and the second PCIe adapter connector; at least one conductor corresponding to a second power rail coupled to the second PCIe adapter connector; and a voltage regulator (VR) coupled between the first power rail and the second power rail, the VR being configured to reduce voltage of power received by the VR from the first power rail and to provide the reduced voltage power from the VR to the second power rail.

7. The adapter of claim 1, where the first PCIe adapter connector is an edge connector configured to mate with a SSD form factor working group (SFFWG) SFF-8639 U.2 connector.

8. The adapter of claim 7, where the distal end of the expansion card carrier is dimensionally configured to be inserted into the PCIe component through a bay opening in the chassis enclosure to couple the first PCIe adapter connector in mated relationship to the system PCIe connector with the proximal end of the expansion card carrier facing outward through the bay opening in the chassis enclosure.

9. The adapter of claim 7, where the expansion card carrier is dimensionally configured to be received within a solid state drive bay of an information handling system chassis enclosure.

10. An information handling system, comprising:
a chassis enclosure enclosing components of the information handling system;
at least one PCIe component bay defined in the chassis enclosure;
a host processing device contained inside the chassis enclosure, the host processing device being coupled to a system PCIe connector that is disposed within the PCIe component bay; and
an adapter including an expansion card carrier received within a SSD bay of an information handling system chassis enclosure in place of a non-volatile memory solid state drive (SSD) carrier, the expansion card carrier having a distal end and a proximal end with an adapter cavity defined therebetween, a first PCIe adapter connector mechanically coupled to the expansion card carrier to face outward at the distal end of the expansion card carrier and being mechanically and electrically mated to the system PCIe connector with the proximal end of the expansion card carrier facing outward through a bay opening in the chassis enclosure;
where the adapter further comprises:
a second PCIe adapter connector mechanically and electrically mated to a PCIe connector of a PCIe expansion card received within the adapter cavity, and
circuitry electrically coupled between the first PCIe adapter connector and the second PCIe adapter connector, the circuitry comprising conductors corresponding to signals of one or more PCIe signal lanes between the first PCIe adapter connector and the second PCIe adapter connector to electrically couple the host processing device to the PCIe expansion card through the system PCIe connector.

11. The system of claim 10, where the PCIe expansion card comprises an external interface on the proximal end of the expansion card carrier that is exposed outside the chassis enclosure through the bay opening defined in the chassis enclosure.

12. The system of claim 10, where the circuitry of the adapter further comprises:
at least one conductor corresponding to a first power rail coupled between the first PCIe adapter connector and the second PCIe adapter connector, the first power rail being coupled to receive power of a first voltage at the first PCIe adapter connector from the system PCIe connector and to provide the power of the first voltage at the second PCIe adapter;
at least one conductor corresponding to a second and different power rail coupled to the second PCIe adapter connector; and
a voltage regulator (VR) coupled between the first power rail and the second power rail, the VR being configured to reduce the first voltage of the power received by the VR from the first power rail to a second voltage and to provide the reduced second voltage power from the VR to the second PCIe adapter connector through the second power rail.

13. The system of claim 10, further comprising:
multiple PCIe component bays defined in the chassis enclosure, each of the PCIe component bays having an opening defined in the chassis enclosure at a proximal end of the bay and a system PCIe connector disposed at a distal end of the bay;
a storage backplane mechanically coupled to support each of the system PCIe connectors at the distal end of one of the bays, the storage backplane comprising a PCIe bus that couples each of the system PCIe connectors to the host processing device; and
where the adapter is received within one of the PCIe component bays of the information handling system chassis enclosure with the first PCIe adapter mechanically and electrically mated to the system PCIe connector supported by the storage backplane at the distal end of the bay to electrically couple the host processing device to the PCIe expansion card through the system PCIe connector and storage backplane with the proximal end of the expansion card carrier facing outward through the bay opening in the chassis enclosure.

14. The system of claim 13, where each of the multiple PCIe component bays is a solid state drive (SSD) bay configured to receive a SSD; and where each of the system PCIe connectors is a SSD form factor working group (SFFWG) SFF-8639 U.2 connector.

15. A method, comprising:
inserting a distal end of an adapter into a PCIe component bay of an information handling system in place and instead of a non-volatile memory solid state drive (SSD) carrier through a bay opening defined in a chassis enclosure of the information handling system, the adapter including an expansion card carrier having a distal end and a proximal end with an adapter cavity defined therebetween, a first PCIe adapter connector mechanically coupled to the expansion card carrier to face outward at the distal end of the expansion card carrier; and
mechanically and electrically mating the first PCIe adapter connector to the system PCIe connector with the proximal end of the expansion card carrier facing outward through the bay opening in the chassis enclosure;
where the adapter further comprises:
a second PCIe adapter connector mechanically and electrically mated to a PCIe connector of a PCIe expansion card received within the adapter cavity, and
circuitry electrically coupled between the first PCIe adapter connector and the second PCIe adapter connector, the circuitry comprising conductors corresponding to signals of one or more PCIe signal lanes between the first PCIe adapter connector and the second PCIe adapter connector to electrically couple a host processing device within the chassis enclosure to the PCIe expansion card through the system PCIe connector; and
where the method further comprises operating the host processing device in signal communication with the expansion card though the PCIe signal lanes between the first PCIe adapter connector and the second PCIe adapter connector with the adapter received in the PCIe component bay of the information handling system.

16. The method of claim 15, further comprising performing the steps of claim 15 without opening the chassis enclosure.

17. The method of claim 15, where the PCIe expansion card comprises an external interface disposed at the proximal end of the expansion card carrier that is exposed outside the chassis enclosure through the bay opening defined in the chassis enclosure; and where the method further comprises operating the host processing device in signal communication with the PCIe expansion card with the interface exposed outside the chassis enclosure through the bay opening.

18. The method of claim 15, where the circuitry of the adapter further comprises:
at least one conductor corresponding to a first power rail coupled between the first PCIe adapter connector and the second PCIe adapter connector;
at least one conductor corresponding to a second power rail coupled to the second PCIe adapter connector; and
a voltage regulator (VR) coupled between the first power rail and the second power rail; and
where the method further comprises:
receiving power of a first voltage at the VR through the first power rail and the first PCIe adapter connector from the system PCIe connector, and
operating the VR to reduce the first voltage of the power received by the VR from the first power rail to a second voltage and to provide the reduced second voltage power from the VR to the PCIe expansion card through the second power rail and the second PCIe adapter connector.

19. The method of claim 15, further comprising performing the following steps after the steps of claim 15 and operating the host processing device in signal communication with the PCIe expansion card through the circuitry of the adapter:
unmating the first PCIe adapter connector from the system PCIe connector and removing the adapter from the PCIe component bay through the bay opening defined in a chassis enclosure;
then unmating the PCIe connector of the PCIe expansion card from the second PCIe adapter connector and removing the PCIe expansion card from the adapter cavity;
then inserting a second and different PCIe expansion card into the adapter cavity and mating a PCIe connector of the second PCIe expansion card to the second PCIe adapter connector;
then inserting the distal end of the adapter into the same PCIe component bay through the bay opening to mechanically and electrically mate the first PCIe adapter connector to the system PCIe connector with the proximal end of the expansion card carrier facing outward through the bay opening in the chassis enclosure; and
then operating the host processing device in signal communication with the second PCIe expansion card through the circuitry of the adapter coupled to the PCIe system connector through the first PCIe adapter connector.

20. The method of claim 15, further comprising performing the following steps after the steps of claim 15 and operating the host processing device in signal communication with the PCIe expansion card through the circuitry of the adapter:
unmating the first PCIe adapter connector from the system PCIe connector and removing the adapter from the PCIe component bay through the bay opening defined in a chassis enclosure; and
then inserting the distal end of a solid state drive (SSD) carrier into the same PCIe component bay through the bay opening to mechanically and electrically mate a PCIe SSD connector to the same system PCIe connector with the proximal end of the SSD carrier facing outward through the bay opening in the chassis enclosure;
then operating the host processing device in signal communication with the SSD coupled to the PCIe system connector through the PCIe SSD connector.

21. The adapter of claim 2, where the PCIe expansion card is an IEEE 1394 card, a serial port card, a USB 3.1 card, a NBASE-T network card, or a sound card.

22. The adapter of claim 2, where the PCIe expansion card is a sound card.

23. The adapter of claim 2, where the PCIe expansion card comprises one or more processing devices.

24. The system of claim 12, where the circuitry of the adapter further comprises:
at least one conductor corresponding to a third power rail coupled between the first PCIe adapter connector and the second PCIe adapter connector, the third power rail being different from the first and second power rails, and the third power rail being coupled to receive power of the same voltage as the second voltage but of higher power capacity than the power of the second power rail at the first PCIe adapter connector from the system PCIe connector and to provide the power of the second voltage and higher power capacity at the second PCIe adapter.

25. The method of claim 15, where the circuitry of the adapter further comprises at least one conductor corresponding to a third power rail coupled between the first PCIe adapter connector and the second PCIe adapter connector, the third power rail being different from the first and second power rails; and where the method further comprises:
  providing the first voltage power through the first power rail and the second PCIe adapter connector;
  receiving power of the same voltage as the second voltage but of higher power capacity than the power of the second power rail at the first PCIe adapter connector from the system PCIe connector, and
  providing the received power of the same voltage as the second voltage but of higher power capacity than the power of the second power rail through the third power rail and the second PCIe connector.

* * * * *